(12) United States Patent
Maze et al.

(10) Patent No.: US 7,740,947 B2
(45) Date of Patent: Jun. 22, 2010

(54) PARTICULATE METAL ALLOY COATING FOR PROVIDING CORROSION PROTECTION

(75) Inventors: Etienne Georges Maze, Breuil le Vert (FR); Gilbert Louis Lelong, Agnetz (FR); Terry E. Dorsett, Chardon, OH (US); Donald J. Guhde, Euclid, OH (US); Toshio Nishikawa, Yokohama (JP)

(73) Assignee: Metal Coatings International Inc., Chardon (CH)

( * ) Notice: Subject to any disclaimer, the term of this patent is extended or adjusted under 35 U.S.C. 154(b) by 312 days.

(21) Appl. No.: 11/710,749

(22) Filed: Feb. 26, 2007

(65) Prior Publication Data

US 2007/0172680 A1    Jul. 26, 2007

Related U.S. Application Data

(63) Continuation of application No. 10/844,693, filed on May 13, 2004, now abandoned, which is a continuation-in-part of application No. 10/045,054, filed on Jan. 15, 2002, now Pat. No. 7,078,076.

(60) Provisional application No. 60/268,273, filed on Feb. 14, 2001.

(51) Int. Cl.
*B32B 11/08* (2006.01)

(52) U.S. Cl. .............. 428/469; 428/1.23; 428/1.32; 428/1.52; 428/846.3; 428/328; 428/329; 501/26; 501/53; 501/62; 148/275

(58) Field of Classification Search .............. None
See application file for complete search history.

(56) References Cited

U.S. PATENT DOCUMENTS

| | | | |
|---|---|---|---|
| 2,944,919 A | 7/1960 | Morris et al. | |
| 3,372,038 A | 3/1968 | Weldes et al. | |
| 3,423,229 A | 1/1969 | Kompanek, Jr. et al. | |
| 3,437,531 A | 4/1969 | Svadlenak | |
| 3,469,071 A | 9/1969 | Feldt et al. | |
| 3,592,699 A | 7/1971 | Steinbrecher et al. | |
| 3,656,975 A | 4/1972 | Phelps, Jr. et al. | |
| 3,671,331 A | 6/1972 | Malkin et al. | |
| 3,687,738 A | 8/1972 | Malkin | |
| 3,849,141 A | 11/1974 | Palm et al. | |
| 3,907,608 A | 9/1975 | Barrett et al. | |
| 3,940,280 A | 2/1976 | de Ridder | |
| 4,213,886 A | 7/1980 | Turner | |
| 4,218,354 A | 8/1980 | Hayati et al. | |
| 4,266,975 A | 5/1981 | Higashiyama et al. | |
| 4,318,747 A | 3/1982 | Ishijima et al. | |
| 4,356,036 A | 10/1982 | Kaliardos | |
| 4,365,003 A | 12/1982 | Danforth et al. | |
| 4,487,815 A | 12/1984 | Dorsett et al. | |
| 4,524,111 A | 6/1985 | Oka et al. | |
| 4,544,581 A | 10/1985 | Pelloski | |
| 4,555,445 A | 11/1985 | Frey et al. | |
| 4,620,873 A | 11/1986 | Orr | |
| 4,663,956 A | 5/1987 | Brun et al. | |
| 4,799,959 A | 1/1989 | Fourez et al. | |
| 4,931,074 A | 6/1990 | Marguier | |
| 5,006,597 A | 4/1991 | Luecke et al. | |
| 5,131,948 A | 7/1992 | Higashiyama et al. | |
| 5,283,280 A | 2/1994 | Whyte et al. | |
| 5,486,414 A | 1/1996 | Roberto et al. | |
| 5,691,048 A | 11/1997 | Roberto et al. | |
| 5,868,819 A | 2/1999 | Guhde et al. | |
| 6,022,639 A | 2/2000 | Urry | |
| 6,270,884 B1 | 8/2001 | Guhde et al. | |
| 6,284,410 B1 | 9/2001 | Durkot et al. | |
| 6,472,103 B1 | 10/2002 | Durkot et al. | |
| 2001/0022149 A1 | 9/2001 | Hirose | |
| 2002/0119337 A1 | 8/2002 | Maze et al. | |

FOREIGN PATENT DOCUMENTS

| | | |
|---|---|---|
| DE | 197 12 642 A1 | 10/1998 |
| EP | 0161129 | 11/1985 |
| EP | 0705910 | 4/1996 |
| EP | 808883 A2 * | 11/1997 |
| EP | 1116756 | 12/2000 |
| EP | 125988 A2 | 8/2001 |
| EP | 1199339 | 2/2002 |
| EP | 1233043 | 2/2002 |
| GB | 801986 | 9/1958 |
| JP | 5314746 | 7/1976 |
| JP | 55028333 A | 2/1980 |
| JP | S55-133471 | 10/1980 |
| JP | 57065764 | 4/1982 |

(Continued)

OTHER PUBLICATIONS

Porter, Frank C.: "Zinc Handbook": Properties, processing and use in design, Marcel Dekker, Inc., ISBN 0/8247/8340-9, published 1991, Chapters 9 and 18.

"Kluth in Farbe and Lack", 67th Edition, No. 4, 1961, pp. 208-217 (untranslated).

R. Schmidt: Zinkstaub-Beschichtungsstoffe in: Korrosionsschutz durch Beschichtungen und Überzüge auf Metallen; D. Grimme, J. Krüger, Weka Fachverlag für technische Führungskräfte, part 9, chapter 4.5, p. 3, 1995. (English Translation included).

*Primary Examiner*—John J. Zimmerman
*Assistant Examiner*—Vera Katz
(74) *Attorney, Agent, or Firm*—Rankin, Hill & Clark LLP

(57) ABSTRACT

Coatings containing particulate metal alloy are disclosed. The coatings provide corrosion protection to a substrate, such as a metal substrate. The coatings contain zinc-metal-containing alloy in flake form, most particularly an alloy flake of zinc and aluminum. The coating can be from compositions that are water-based or solvent-based. The compositions for providing the coating may also contain a substituent such as a water-reducible organofunctional silane, or a hexavalent-chromium-providing substance, or a titanate polymer, or a silica substance constituent. the coating may desirably be topcoated.

13 Claims, No Drawings

FOREIGN PATENT DOCUMENTS

| | | |
|---|---|---|
| JP | S59-66468 | 4/1984 |
| JP | S60-75366 | 4/1985 |
| JP | 60133072 | 7/1985 |
| JP | 61261372 A | 11/1986 |
| JP | 61261373 A | 11/1986 |
| JP | 4270768 A | 9/1992 |
| JP | 6009897 A | 1/1994 |
| JP | 62-60839 | 9/1994 |
| JP | H-08 073778 A | 3/1996 |
| JP | 61-261373 | 11/1996 |
| JP | 09-268265 | 10/1997 |
| JP | 09268264 | 10/1997 |
| JP | 10046058 A * | 2/1998 |
| JP | H11-116856 | 4/1999 |
| JP | 11-343422 | 12/1999 |
| JP | H-11 343422 | 12/1999 |
| JP | 2000005697 | 1/2000 |
| TW | 42796 | 4/1982 |
| WO | 92/09663 | 6/1992 |
| WO | 0185854 A1 | 11/2001 |

* cited by examiner

PARTICULATE METAL ALLOY COATING FOR PROVIDING CORROSION PROTECTION

CROSS-REFERENCE TO RELATED APPLICATIONS

This application is a continuation of U.S. application Ser. No. 10/844,693 filed May 13, 2004, now abandoned, which is a continuation-in-part of U.S. application Ser. No. 10/045,054 filed Jan. 15, 2002, now U.S. Pat. No. 7,078,076, which claims the benefit of U.S. Provisional Application No. 60/268,273, filed Feb. 14, 2001.

BACKGROUND OF THE INVENTION

A variety of coating compositions having a liquid medium, generally at least substantially resin-free, which can be chromium-containing coating compositions, but that can also include those that don't contain chromium, and all typically for protecting ferrous substrates, are known. Of special interest are those which contain particulate metal. Representative coating compositions of this type that were initially developed could be quite simplistic, such as compositions containing essentially chromic acid and particulate metal in an alcohol medium, as disclosed in U.S. Pat. No. 3,687,738.

A later development of particular effectiveness for providing a corrosion-resistant coating on metal substrates was the more complex composition such as shown in U.S. Pat. No. 3,907,608. The composition comprised chromic acid, or equivalent, a particulate metal of mainly zinc or aluminum, wetter and a liquid medium comprising water plus high-boiling organic liquid. The composition had very desirable coating characteristics when including a viscosity modifier such as a water-soluble cellulose ether, as disclosed in U.S. Pat. No. 3,940,280.

The coating could be especially useful as an undercoating. Thus it has been taught to use such a more complex coating composition as an undercoating over ferrous surfaces. The coating is then provided with a silicate topcoating, as disclosed in U.S. Pat. No. 4,365,003.

It has been known that where coating compositions could contain the particulate metal as untreated aluminum flake, such flake can be unstable in water-based coating compositions. In such water-based coating compositions, standard aluminum flake will react with water in the composition to form hydrogen gas. One approach for avoiding this problem has been to coat the aluminum flake. One such coating is an acrylic coating formed by reacting mono-ethylenically unsaturated silane with acrylic monomers having amine hydroxyl or epoxy groups, as disclosed in U.S. Pat. No. 4,213,886. However, these products are specialty items tailored to provide a coating of good glamour appearance and have not found a wide acceptance.

There has also been proposed the preparation of coating compositions that contain hydrolyzed organotrihydrocarbonoxy silane and a particulate metal. These compositions, such as disclosed in U.S. Pat. No. 4,218,354, can provide corrosion protection to a coated substrate. The silanes utilized are not water-reducible and, thus, it can be expected that the compositions are best formulated in the presence of organic liquid.

More recently, it has been taught in U.S. Pat. No. 5,868,819 that composition substituents which are epoxy functional silanes, and which are water-reducible, can be useful in forming compositions for coating metal substrates. The compositions reply on a variety of ingredients to provide for a chrome-free system.

Other compositions containing particulate metal and finding utility by providing corrosion protection for a substrate are well known. Some of these will be more particularly discussed hereinbelow. It would be desirable to provide a coating from all such compositions, and also to provide a coating combination of undercoating plus topcoating, each of which could have wide acceptance. It would further be desirable to provide same, which would offer outstanding corrosion protection to metal substrates and be efficiently and economically produced.

SUMMARY OF THE INVENTION

The present invention can offer such features. The coating offers outstanding corrosion-resistance such as on coated steel parts. In addition to corrosion-resistance, deposited films can have excellent coating adhesion. Coating compositions for the combination may be one-package compositions, and in such case provide ease of preparation, storage and transport as well as use. Coating compositions that are typically one-package compositions may lend themselves to extended storage stability.

In one aspect, the invention is directed to a coating composition adapted for application to, and curing on, a substrate, which composition contains particulate metal in a liquid medium and provides corrosion resistance as a cured coating on the substrate, wherein there is provided the improvement in the particulate metal constituency of such composition comprising: zinc alloy in flake form comprising greater than 50 weight percent zinc in the alloy flake and a balance that is less than 50 weight percent of non-zinc alloy metal in the alloy flake. In another aspect, the invention is directed to preparing a corrosion-resistant coated substrate in a method utilizing this coating composition and curing applied coating composition on a substrate.

In another aspect, the invention is directed to a coated substrate protected with a chrome-free, corrosion-resistant coating from a composition comprising: (A) liquid medium; (B) zinc alloy in flake form comprising greater than 50 weight percent zinc in said alloy flake, and a balance of less than 50 weight percent of additional alloy metal; and (C) silane binding agent.

In another aspect, the invention includes the method of preparing a corrosion-resistant coated substrate protected with a chrome-free, corrosion-resistant coating, which method comprises: (1) applying to the substrate a coating composition comprising: (A) liquid medium; (B) zinc alloy in flake form comprising greater than 50 weight percent zinc in the alloy flake, and a balance of less than 50 weight percent of additional alloy metal; and (C) silane binding agent; with the coating composition being applied in an amount sufficient to provide, upon curing, above about 500 but not substantially above about 9,000 mg/ft$^2$ of coating on the coated substrate; and (2) heat curing applied coating composition on the substrate at a temperature up to about 700° F. for a time of at least about 10 minutes.

In another aspect, the invention is directed to a coated substrate protected with a corrosion-resistant coating from a coating composition comprising: (A) liquid medium; (B) zinc alloy in flake form comprising greater than 50 weight percent zinc in said alloy flake and a balance of less than 50 weight percent on non-zinc alloy metal; and (C) a hexavalent-chromium-providing substance.

An aspect of the invention also includes preparing a corrosion-resistant coated substrate utilizing this coating and employing coating amounts and curing conditions as described hereinabove.

In yet another aspect, the invention is directed to a coated substrate protected with a corrosion-resistant coating from the coating composition comprising: (A) zinc alloy in flake form comprising greater than 50 weight percent zinc in said alloy flake and a balance of less than 50 weight percent on non-zinc alloy metal; (B) a titanate polymer; and (C) a liquid vehicle comprising organic liquid for such titanate polymer.

The method of preparing a corrosion-resistant coated substrate utilizing this coating composition is a further invention aspect, particularly to curing applied coating at a temperature up to about 600° F. for a time of at least about 10 minutes.

In a still further aspect, the invention is directed to a coated substrate protected with a corrosion-resistant coating from the coating composition comprising: (A) liquid medium; (B) zinc alloy in flake form comprising greater than 50 weight percent zinc in said alloy flake and a balance of less than 50 weight percent on non-zinc alloy metal; and (C) one or more of a water-soluble and water dispersible silica substance.

Considerations for preparing a corrosion-resistant coated substrate with the coating composition also apply as an invention aspect, particularly to curing applied coating composition up to about 700° F. for a time of at least about 10 minutes.

DESCRIPTION OF THE PREFERRED EMBODIMENTS

The particulate metal of the coating composition will be a zinc alloy in flake form. The particulate metal is an alloy of zinc in flake form generally comprising at least greater than 50 weight percent zinc, usually depending on the particular alloy. The balance of the alloy is thus less than 50 weight percent of non-zinc alloy metal. For a zinc/aluminum alloy the zinc advantageously comprises greater than about 80 weight percent zinc, metals basis, or, conversely, less than about 20 weight percent aluminum, and preferably greater than about 85 weight percent zinc, or less than about 15 weight percent aluminum. For a zinc/tin alloy, on a metals basis, there is advantageously at least about 70 weight percent of zinc, or, conversely, not more than about 30 weight percent tin. For considering corrosion resistance of coated substrate, the alloy is preferably an alloy of zinc and aluminum in flake form.

Advantageously for economy of alloy production, the zinc alloy will be in flake form in a paste. In the alloy of zinc with aluminum in a paste, the aluminum may most advantageously be present in an amount up to about 8 weight percent, basis weight of the paste. For corrosion resistance of the coating balanced with coating adhesion, the aluminum will preferably not contribute more than about 5 weight percent, basis weight of the paste. In certain preferred embodiments of the invention, the zinc alloy in paste form may include aluminum in a concentration of from about 1 to about 10 weight percent, basis weight of the paste. More preferably, the concentration of aluminum in such paste is from about 2 to about 8 weight percent and more preferably from about 2 to about 4 weight percent, basis weight of the paste. Although these concentration ranges for aluminum in zinc alloy pastes are generally the preferred ranges, the present invention encompasses concentration ranges less than 1 weight percent, such as from about 0.1 up to about 1 weight percent, basis weight of the paste. The total of the zinc alloy flake will generally contribute from 90 to 95 weight percent or more of the paste, with a balance of paste liquid. The alloy flake paste can contribute some liquid in minor amount, e.g., dipropylene glycol or mineral spirits, or some liquid even in trace amount to the coating composition. It has been found that the zinc alloy flake paste can be generally useful, together with other coating composition ingredients, for those coating compositions that will contain particulate metal in paste form. It is also contemplated that the special alloy flake can be useful when prepared in dry form. Such dry form paste can thus be 99 weight percent or more of alloy flake.

Zinc alloys in flake form other than the zinc and aluminum alloy, or zinc and tin alloy, can be useful. These include zinc alloyed with one or more of magnesium, nickel, cobalt and manganese. A representative three-metal alloy flake is zinc-aluminum-magnesium alloy. The preferred alloy paste for the undercoating composition is STAPA 4ZnAl7 made by Eckart-Werke, which is a paste of zinc and aluminum alloy in flake form typically containing from about 85 to about 86 weight percent zinc, from about 4 to about 8 weight percent aluminum and a balance of from about 7 to about 10 weight percent paste liquid, all basis 100 weight percent of the paste. Such a paste containing from about 4 to about 5 weight percent of aluminum in the alloy is also of particular interest. As noted, certain preferred embodiments utilize a relatively low concentration of aluminum, i.e. as low as about 2 weight percent. Such a paste comprises from about 2 to about 4 weight percent aluminum and from about 87 to about 89 weight percent zinc and a balance of from about 7 to about 10 weight percent paste liquid. For embodiments utilizing a lower concentration of aluminum, i.e. about 1 weight percent, the concentration of zinc is about 90 weight percent, with the balance being paste liquid. With regard to particle size, the preferred alloy flake of zinc and aluminum will generally have a size such that at least about 50 weight percent of the flake particles will have a longest dimension of less than about 13 microns, and preferably has at least about 90 weight percent of the particles with a longest dimension of less than about 15 microns. For convenience, the non-alloy balance of the paste, i.e., the about 7 to about 10 weight percent balance, is referred to herein for convenience as the paste liquid. It will, however, be understood that this balance may contain substituents, e.g., lubricants used in making the paste, that are not in liquid form when the paste is utilized in the coating composition.

It is to be understood that the zinc alloy flake may be present in a coating composition with other pulverulent metal, which is in non-flake form, e.g., zinc, aluminum, aluminum alloy, or mixtures thereof in pulverulent, non-flake form. Thus, this pulverultent metal in non-flake form may also be in non-alloy form. Such metal in other form may be incorporated with the paste, but more typically will be blended into the coating composition generally, although it could be used in both. Typically only minor amounts of such other pulverulent metal, in non-flake form, will be present in the coating composition, and the incorporation of such other metal is often avoided. Usually, the non-flake metal might be in powder form.

Although it is contemplated that the zinc alloy flake will be useful in any coating composition wherein particulate metal is utilized in a liquid vehicle (or "liquid medium" as such term is used herein) to prepare a corrosion-resistant coating, several compositions are of particular interest. Hereinbelow, these coating compositions of particular interest will be next to be discussed.

A. Chromium-Free Coating Composition

These coating compositions, when prepared in final form for application to a substrate, will usually be referred to simply as the "coating composition". These are compositions that contain a silane substituent, as will be more particularly described hereinbelow. Preferred coating compositions of this type have been described in U.S. Pat. No. 5,868,819. Generally, these preferred compositions may be referred to as a "water-reducible coating composition". For supplying the liquid medium of the coating composition, there will usually be used water in combination with organic liquid, which organic liquid may also be referred to herein as the "solvent". Some of these chromium-free coating compositions will be merely solvent based. Those that contain water in general will be infinitely dilutable with water.

Water is present in the preferred compositions in an amount from at least about 20, and generally not above about 70 weight percent, basis total composition weight. The organic liquid of these preferred, water-reducible compositions can be a low-boiling organic liquid, such as disclosed in U.S. Pat. No. 6,270,884, although it also can be a high-boiling organic liquid, and may include mixtures of the foregoing. High-boiling organic liquids that boil above about 100° C. have been disclosed in U.S. Pat. No. 5,868,819. The low-boiling organic liquids have a boiling point at atmospheric pressure below about 100° C., and are preferably water-soluble. Such may be represented by acetone, or low molecular weight alcohols such as methanol, ethanol, n-propylalcohol and iso-propylalcohol, and further include ketones that boil below 100° C., such as water-soluble ketones, e.g., methyl ethyl ketone.

Generally, the organic liquid will be present in the preferred water-reducible compositions in an amount from about 1 to about 30 weight percent, basis total composition weight. Preferably, for economy plus ease of composition preparation, acetone will supply the low-boiling organic liquid and will be present in an amount between about 1 and about 10 weight percent of the total composition. Generally, representative high-boiling organic liquids for the preferred water-reducible compositions contain carbon, oxygen and hydrogen. They may have at least one oxygen-containing constituent that may be hydroxyl, or oxo, or a low molecular weight ether group, i.e., a $C_1$-$C_4$ ether group. Since water dispersibility and preferably water solubility is sought, high molecular weight polymeric hydrocarbons are not particularly suitable, and advantageously serviceable hydrocarbons contain less than about 15 carbon atoms and have a molecular weight of 400 or less. Particular hydrocarbons, which may be present as high-boiling organic liquid, include tri- and tetra-ethylene glycol, di- and tripropylene glycol, the monomethyl, dimethyl, and ethyl ethers of these glycols, low molecular weight liquid polypropylene glycols, as well as diacetone alcohol, the low molecular weight ethers of diethylene glycol, and mixtures of the foregoing. Where the organic liquid is a mixture of high-boiling organic liquid with low-boiling organic liquid, such a mixture can be represented by acetone plus dipropylene glycol.

In addition to the particulate metal and the liquid medium, another necessary ingredient in these compositions is silane, sometimes referred to herein as the "silane binding agent". For the preferred compositions, these can include water-reducible, organofunctional silane. To be water-reducible, the silane should be readily dilutable with water and is preferably completely dilutable with water. The useful silane for other than the preferred compositions can be one where the silane must have a cosolvent present when reduced with water, so as to prevent gellation on water reduction, or to prevent the formation of a precipitate. For example, silanes such as the organotrihydrocarbonoxy silanes of U.S. Pat. No. 4,218,354, and as represented by methyltriethyoxy silane, are useful for other than the preferred water-reducible compositions. These silanes must be blended with a cosolvent and water, e.g., ethylene glycol monoethyl ether and water. For these silanes, the silane and water react such that without the cosolvent, fast gellation would be typical. In this regard, the silanes which are useful herein in the preferred chromium-free compositions are non-gelling, water-reducible silanes. In these silanes, the organofunctionality can be represented by vinyl, e.g., as in vinyltrimethyoxysilane, or methacryloxy, such as in methacryloxypropyl-trimethyoxysilane, and amino, as in 3-amino-propyltrimethyoxysilane, but is preferably epoxy functional for enhanced coating performance as well as composition stability. These generally contain the —$Si(OCH_3)_3$ functionality, or the —$Si(OCH_2CH_3)_3$ or —$Si(OCH_2CH_2CH_3)_3$ functionality. These silanes will generally contribute from about 3 weight percent to about 20 weight percent of the total composition weight. Preferably, the useful silane in the preferred water-reducible composition is an epoxy functional silane such as beta-(3,4-epoxycyclohexyl) ethyltrimethoxy-silane, 4(trimethyoxysiyl)butane-1,2 epoxide or gamma-glycidoxypropyltrimethyoxysilane.

For the purpose of helping the dispersing of the zinc alloy flake in the chromium-free coating composition, there may be added a dispersing agent, i.e., surfactant, serving as a "wetting agent" or "wetter", as such terms are used herein. Suitable such wetting agents or mixture of wetting agents can include nonionic agents such as the nonionic alkylphenol polyethoxy adducts, for example. Also, there can be used anionic wetting agents, and these are most advantageously controlled foam anionic wetting agents. Serviceable such wetting agents or mixture of wetting agents can include anionic agents such as organic phosphate esters, as well as the diester sulfosuccinates as represented by sodium bistridecyl sulfosuccinate. The amount of such wetting agent is typically present in an amount from about 0.01 to about 10 weight percent of the total coating composition.

These coating compositions, in general, may also contain additional ingredients. As additional ingredients, the coating composition may also contain what is usually referred to herein as a "boric acid component", or "boron-containing compound". It is convenient to use orthoboric acid, commercially available as "boric acid", although it is also possible to use various products obtained by heating and dehydrating orthoboric acid, such as metaboric acid, tetraboric acid and boron oxide, as well s salts, e.g., zinc borate or the like. The boric acid component should be present in an amount of at least about 0.1 weight percent and may be present in an amount up to about 10 weight percent or more of the preferred composition.

The compositions may also contain a pH modifier, which is able to adjust the pH of the composition. The pH modifier is generally selected from the oxides and hydroxides of alkali metals, with lithium and sodium as the preferred alkali metals for enhanced coating integrity; or, it is selected from the oxides and hydroxides usually of the metals belonging to the Groups IIA and IIB in the Periodic Table, which compounds are soluble in aqueous solution, such as compounds of strontium, calcium, barium, magnesium, zinc and cadmium. The pH modifier may also be another compound, e.g., a carbonate or nitrate, of the foregoing metals.

Some of these compositions may also contain thickener. The thickener, when present, can contribute an amount of between about 0.01 to about 2.0 weight percent of thickener, basis total composition weight. This thickener can be a water-soluble cellulose ether, including the "Cellosize" (trademark) thickeners. Suitable thickeners include the ethers of hydroxyethylcellulose, methylcellulose, methylhydroxypropylcellulose, ethyl-hydroxyethylcellulose, methylethylcellulose or mixtures of these substances. Other thickening agents include xanthan gum, associative thickeners, such as the urethane associative thickeners and urethane-free nonionic associative thickeners, which are typically opaque, high-boiling liquids, e.g., boiling above 100° C. Other suitable thickeners include modified clays such as highly beneficiated hectorite clay and organically modified and activated smectite clay, although such is not preferred.

Some of these compositions may contain ingredients in addition to those already enumerated hereinabove. These other ingredients may include phosphates. It is to be understood that phosphorous-containing substituents, even in slightly soluble or insoluble form, may be present, e.g., as a pigment such as ferrophos. The additional ingredients will frequently be substances that can include inorganic salts, often employed in the metal coating art for imparting some corrosion-resistance or enhancement in corrosion-resistance. Materials include calcium nitrate, dibasic ammonium phosphate, aluminum tripolyphosphate, calcium sulfonate, 1-nitropropane, lithium carbonate (also useful as a pH modifier), or the like, and, if used, these are most usually employed in the coating composition in a total combined amount of from about 0.1 to about 2 weight percent.

As mentioned hereinabove, these compositions are "chromium-free". By being chromium-free it is meant that the composition preferably contains no chromium ion, e.g., as trivalent or hexavalent chromium, including such chromium in ion form as could be contributed by chromic acid or dichromate salts. If any hexavalent chromium is present, advantageously it should not exceed trace amounts, e.g., be present to provide less than 0.1 milligram of chromium per square foot of coating, for best environmental concerns. It is to be understood that the composition may contain chromium in non-soluble form, as for example metallic chromium contributed as part of the zinc alloy flake. Where compositions herein have been described as resin-free, such are preferably resin-free excepting for trace amounts of resin, but such may include minor amounts of resin, such as a few weight percent, e.g., 1 to 2 weight percent, of resin. By resin it is meant the generally synthetic, polymeric resins, which are typically used as binders in paint systems, but is not meant to include either thickening agent, when present, or to include the silane binding agent.

The compositions can be formulated in a variety of procedures. For example, as an alternative to directly using the silane binding agent in a concentrated form, the silane may be utilized as a more dilute premixture of the silane, such as the silane mixed with a diluent, e.g., a diluent selected from the substituents providing the coating composition liquid medium, such as water, or water plus boric acid component, or water plus organic liquid including acetone. As an additional example of a composition preparation procedure, a precursor mixture might be prepared from the organic liquid, which may be present together with wetting agent, while further including the metal flake. Packaging concepts, as well as formulation considerations for how the coating composition is prepared, can be taken into consideration when bringing undercoating composition ingredients together. Even considering storage stability, the water-reducible compositions are, however, preferably always a one-package formulation of all coating composition ingredients.

B. Chromium-Containing Coating Composition

The chromium-containing coating compositions need not be complex and yet form highly desirable, corrosion-resistant coatings on the substrate metal surface after curing at elevated temperature. Some of the very simple chromium-containing undercoating compositions, such as have been taught in U.S. Pat. No. 3,687,738, can merely contain chromic acid and a particulate metal in liquid medium.

These corrosion-resistant, chromium-containing compositions can contain chromic acid as the chromium-providing substance or its equivalent in aqueous medium, for example, chromium trioxide or chromic acid anhydride. But for some compositions, chromium may be supplied, in whole or in part, by a salt such as ammonium dichromate, or by sodium or potassium salts, or by substances such as calcium, barium, magnesium, zinc, cadmium, and strontium dichromate. Additionally, for some compositions, the hexavalent-chromium-providing substance might be a mixed chromium compound, i.e., include trivalent chromium compounds. Although some compositions might contain only a small amount, e.g., 5 grams per liter of hexavalent chromium, expressed as $CrO_3$, and may contain as much as about 100 grams per liter of composition of hexavalent chromium, expressed as $CrO_3$, many compositions will typically contain between about 20 to 60 grams.

Substantially all of these coating compositions are simply water-based, for economy. But for additional or alternative substances, to supply the liquid medium at least for some of these compositions, there have been taught, as in U.S. Pat. No. 3,437,531, blends of chlorinated hydrocarbons and a tertiary alcohol including tertiary butyl alcohol as well as alcohols other than tertiary butyl alcohol. In the selection of the liquid medium, economy will generally be of major importance, and thus such medium will most always contain readily commercially available liquids.

Particularly preferred chromium-containing coating compositions, for enhanced coating adhesion as well as corrosion resistance, will contain thickeners, such as water soluble cellulose ethers and will also contain high-boiling organic liquid. For economy, these particular coating compositions preferably contain between about 0.01 to 3 weight percent of water soluble cellulose ether, such as hydroxyethylcellulose, methylcellulose, methylhydroxypropylcellulose, ethylhydroxyethylcellulose, methylethylcellulose or mixtures of these substances. Although the cellulose ether needs to be water-soluble to augment thickening for these particular coating compositions, it need not be soluble in the high-boiling organic liquid, which liquid can contribute up to 50 volume percent of the coating composition based on the total volume of liquid in the coating composition. Such organic liquid, when present, also can supply substantially above about 5 volume percent, and advantageously above about 15 volume percent, both on the same basis as for the 50 volume percent, of the coating composition liquid.

in addition to the chromium-providing substance, the liquid medium and the zinc alloy flake, some of these chromium-containing coating compositions that are water-based will nevertheless contain some organic liquid. The preferred organic liquid has a boiling point at atmospheric pressure above 100° C., while preferably being water-soluble. These have been discussed hereinabove in connection with the chromium-free coating compositions. Representative preferred coating compositions have been discussed in U.S. Pat. No. 3,907,608, which is hereby incorporated by reference. For additional substituents that may be contained in some of these compositions, e.g., wetters, boric acid component, pH modifiers and other ingredients, reference can be made hereinabove to the discussions of these ingredients for the chromium-free coating compositions.

C. Titanate Binder Coating Composition

To provide a dark black color, some of the titanate binder coating compositions may contain manganese dioxide. A representative coating of this type has been disclosed in U.S. Pat. No. 4,544,581. Both natural manganese dioxide ($MnO_2$ B) from refined ore and synthetically manufactured manganese dioxide ($MnO_2$ M) are satisfactory. Synthetic manganese dioxide has a higher, concentration of Mn and $MnO_2$ and a larger particle size (97% vs. 76% passing through a 325-mesh screen). Synthetic manganese dioxide contains about 2 to 3 percent water while natural manganese dioxide has no detectable water. It is usually preferable to use only sufficient manganese dioxide to provide a coating having the desired darkness for a particular application so that it will provide greater corrosion resistance. When manganese dioxide is present, the amount of manganese dioxide in the coating can be from about 20 to about 45 percent by weight of the solids in the coating. This amount of manganese dioxide can be on the order of equivalent to from about 30 to about 100 percent by weight of the zinc alloy flake metal.

In this titanate binder coating composition, the primary bonding material is generally an organic titanate polymer, which is polyfunctional. When the coating is heated to a temperature in the range of about 275 to 450° F., this titanate polymer produces a purely inorganic titanium dioxide, which bonds the coating to the metal substrate. This heating also initiates a hydrolysis reaction, which enhances and optimizes the adhesion and abrasion resistance of the dried and cured coating. Suitable titanate bonding materials are alkyl esters of tetraisopropyl titanate, tetrabutyl titanate, 2-ethylhexyl titanate and N-butyl titanate polymer. The amount of titanate polymer in the coating can be from about 6 to about 20 percent by weight of the solids in the coating.

Preferably, to improve film integrity and insure adhesion to a substrate before the primary bonding material is cured, the titanate binder undercoating also contains a secondary resin. The amount of secondary resin can be about 0.5 to 10 percent by weight of dry film solids. Suitable secondary resins include ethyl-hydroxyl-ethyl cellulose, polyesters, silicones, epoxy resin in the presence of caprolactam pyrrolidone and piperidone, conjugated drying oils, unsaturated carboxylic amides and aromatic asphalt resins.

Preferably, to insure that the titanate binder coating does not gel prior to application to a substrate and that it has suitable flow and wetting characteristics around edges of the substrate, the coating contains a thixotropic agent. A suitable thixotropic agent is silane treated silica dioxide. The amount of this thixotropic agent in the coating may be about 0.4 to 12 percent by weight of the particulate metal, which may be all zinc alloy flake metal. The titanate binder undercoating may also contain a silane such as the silanes detailed hereinabove in connection with the water-reducible, chromium-free coating compositions. A suspension agent may also be used to ensure that the alloy flake metal does not settle out of the titanate binder coating composition. A suitable suspension agent is polyethylene. The amount of polyethylene used as a suspension agent may be about 0.2 to 5 percent by weight of the particulate metal, which metal can be all zinc alloy flake metal.

To ensure that the titanate binder coating composition does not undergo a hydrolysis reaction before the coating is applied to a substrate, the coating advantageously contains a water scavenger or hygroscopic agent. inclusion of a hygroscopic agent is particularly desirable when a synthetic manganese dioxide pigment is used since it contains 2 to 3 percent water, which, over a period of time, could at least partially hydrolize, the titanate bonding material. Suitable hygroscopic agents are calcium oxide, silica dioxide, barium oxide, and potassium chloride. The amount of hygroscopic agent in the coating composition may be 0.2 percent to 12 percent by weight of the particulate metal, e.g., all zinc alloy flake metal, and preferably about 0.4 percent to 6 percent by weight of such metal.

The vehicle or carrier of the titanate binder coating composition may contain both active and inactive solvents. The active solvents dissolve the titanate primary bonding polymers and the inactive solvents decrease the cost of the vehicle, are excellent thinners of the coating composition, and are believed to modestly improve adhesion and salt spray resistance by modifying and controlling film flow. The vehicle solvents may consist of about 10 percent to 60 percent by weight of inactive solvents and the balance preferably of active solvents.

Suitable active solvents for the titanate polymers are butyl alcohol N-butanol (hereinafter N-butanol), 2-ethylhexanol, cellosolve acetate, heptane, methyl ethyl ketone and methyl isobutyl ketone. Suitable inactive solvents include aromatic hydrocarbons such as xylol, xylene, and toluene. Where the solvent is such as a high-boiling hydrocarbon, as described hereinbefore in connection with the chromium-containing undercoatings, e.g., dipropylene glycol, such solvent itself may be serviceable for providing most, to all, of the composition vehicle and be compatible with the titanate polymer.

The coating composition contains sufficient vehicle solvents to produce the viscosity desired for the particular method of applying the liquid coating to a substrate. For application of the coating to a substrate by dipping, rolling or spraying, the viscosity of the composition in a Zahn No. 2 cup is usually in the range of 20 to 150 seconds. A coating composition viscosity in this range can usually be obtained when the vehicle solvents by weight are about 0.9 to 1.5 times the weight of all the resins in the composition. A process for making a titanate polymer undercoating composition with active plus inactive solvents is disclosed in the above-mentioned U.S. Pat. No. 4,544,581, the disclosure of which is incorporated herein by reference.

As will be understood, a titanate binder coating providing a black color may be a topcoat. The basecoat may be any of a variety of coatings, e.g., one or more of a phosphate pretreatment such as of zinc phosphate, or a paint basecoat such as a zinc-rich paint, or a titanate binder coating without black color. General basecoat and topcoat consideration, which basecoats may include pretreatments, will be discussed further hereinbelow.

D. Silica Substance Coating Composition

A typical coating of this type includes the zinc alloy metal flake and a silica substance constituent, sometimes referred to herein as a silica substance "binder" such as sodium silicate. The water-soluble or water dispersible binder may also more broadly be an alkali metal silicate, an organic silicate ester, e.g., ethyl silicate, a colloidal silica sol or the like. Further, organic ammonium silicates have been disclosed as binders. The use of ethyl silicate or the like has been disclosed in U.S. Pat. No. 3,469,071 and the utilization of an organic ammonium silicate has been disclosed in U.S. Pat. No. 3,372,038. The disclosures of these two patents are hereby incorporated by reference. For convenience, the binder can be referred to herein as a silica substance binder and the composition as a silica substance coating composition. The liquid medium of these coating compositions will be a water-based liquid medium and may comprise water such as deionized water or tap water.

in addition to the zinc alloy metal flake, silica substance as a binder and liquid medium, these coating compositions can contain additional ingredients. The use as an oxidizing agent of red lead or the peroxides of calcium, magnesium and zinc has been disclosed in U.S. Pat. No. 2,944,919. Additionally, a thickening agent, such as a cellulose ether or xanthan gum, as well as a gelling agent, is generally useful. it may be better not to try to add the thickening agent directly but rather, to prepare an aqueous suspension of the thickener and then to add this suspension to the rest of the vehicle or binder. With hydrated magnesium silicates, for instance, the addition of 0.32 to 0.66 percent based on the silica present in the binder can be effective to increase the undercoating adhesion.

Lead oxide added to the coating composition may increase the pot life of the composition. The coating may also include inorganic extenders, such as zinc oxide, iron oxide, aluminum oxide, and the like, and inorganic pigments such as titanium oxide. The substances iron oxide and zinc oxide may also be useful as pigments. Mica, bentonite, and the like may be used to increase flexibility in the coating.

Coatings: General Considerations

A. Application

Usually, the silicate coatings are applied by brush application. As mentioned hereinabove, titanate binder coating compositions typically may be applied by dipping, rolling or spraying techniques. Generally, the coating compositions may be applied by any of these various techniques, such as immersion techniques, including dip drain and dip spin procedures. Where parts and coating compositions are compatible with same, the coating compositions can be applied by curtain coating, brush coating or roller coating and including combinations of the foregoing. It is also contemplated to use spray technique as well as combinations, e.g., spray and spin and spray and brush techniques. Coated articles that are at an elevated temperature may be coated, often without extensive cooling, by a procedure such as dip spin, dip drain or spray coat.

B. Substrates and Undercoats

The protected substrate can be any substrate, e.g., a ceramic or similar substrate, but is most particularly a metal substrate such as a zinc or iron, e.g., a steel substrate, an important consideration being that any such substrate withstand the heat curing conditions for the coating. By a "zinc" substrate it is meant a substrate of zinc or zinc alloy, or a metal such as steel coated with zinc or zinc alloy, as well as a substrate containing zinc in intermetallic mixture. Likewise, the iron of the substrate can be in alloy or intermetallic mixture form.

Especially where such are metal substrates, which are most usually ferrous substrates, these may already be coated, including pretreatments, e.g., pretreatment by chromate or phosphate treatment, prior to application of the coating. Particularly for some coatings, the substrate may be pretreated to have, for example, an iron phosphate coating in an amount from about 50 to about 100 mg/ft$^2$ or a zinc phosphate coating in an amount from about 200 to about 2,000 mg/ft$^2$. However, a zinc phosphate coating may be avoided where the undercoating will be cured at elevated temperature. In general, the substrate may have received any undercoating as is contemplated for use, especially for use with the above-described compositions of particular interest. For further undercoating considerations, reference can be made hereinabove, such as in the discussion of the titanate binder coatings.

C. Curing and Coating Weight

After application of the coating composition to the substrate, it is preferred for best corrosion-resistance to subsequently heat-cure the applied coating, excepting for some silica substance coatings where air-drying can be effective. However, volatile coating substances may be initially simply evaporated from any of the applied coatings, e.g., by drying before curing. Cooling after drying may be obviated. The temperature for such drying, which may also be referred to as precuring, can be within the range from about 100° F. up to not essentially above about 250° F. Drying times can be on the order of from about 2 to about 25 minutes.

Any elevated temperature curing of an coating composition on a substrate will often be a hot air oven cure, although other curing procedures can be used, e.g., infrared baking and induction curing. The coating composition can be heat-cured at elevated temperature, e.g., on the order of about 450° F., but usually greater, oven air temperature. The cure will typically provide a substrate temperature, usually as a peak metal temperature, of at least about 450° F. Oven air temperatures may be more elevated, such as on the order of 650° F. or more. It has been found highly desirable with the hereinbefore described chromium-free coating compositions to utilize a more elevated temperature cure. Such can be on the order of from 330° C. (626° F.) to 360° C. (680° F.), with temperatures up to 700° F. being optional. Thus, for these compositions, a peak metal cure temperature range of above 650° F. up to about 680° F. or more may be employed. On the other hand, a less elevated peak metal temperature for curing a substrate coated with a titanate binder composition of up to about 600° F. can be advantageous.

Curing, such as in a hot air convection oven, can be carried on for several minutes. Although cure times may be less than 5 minutes, they are more typically on the order of from at least about 10 to about 45 minutes. it is to be understood that cure times and temperatures can be effected where more than one layer of coating is applied or when there may be a subsequently applied topcoating that is a heat-cured topcoating. Thus, shorter time and lower temperature cures may be employed. Also, where more than one coating is applied, or with a heat-curable topcoating, the coating may only need be dried, as discussed hereinabove. Then, curing can proceed after application of the heat-cured topcoating.

The resulting weight of the coating on the metal substrate may vary to a considerable degree, but, usually excepting for a silica substance coating, will generally be present in an amount supplying greater than 500 mg/ft$^2$ of coating. A lesser amount may generally not lead to desirably enhanced corrosion-resistance. Advantageously, a coating of greater than about 1,000 mg/ft$^2$ of coated substrate will be present for best corrosion-resistance. It has been found that a coating weight on the order of about 1,800 mg/ft$^2$ can be most advantageous for a coating from the chromium-free coating compositions. It can often be expected that between about 1,500 to 9,000 mg/ft$^2$ of coating will be present. Under these general considerations, the particulate metal in the coating will typically be present in an amount from about 500 mg/ft$^2$ to about 5,000 mg/ft$^2$.

Topcoating

Often, except where otherwise detailed herein, there need not be applied any topcoating, especially with the above-described compositions of particular interest. This can be the case when the above-described coating compositions are used for a single coating layer, or a multi-coating layer. For example, with the chromium-free coating compositions, usually two or three coating layers will be sufficient to achieve a highly desirable corrosion-resistant coating. However, the following discussion is offered where topcoating considerations may apply.

Silica Substance Topcoating

In the present invention, the coated substrate may be topcoated, as with silica substance. The term "silica substance", as it is used herein for the topcoating, is intended to have the same meaning as for the above-described silica substance coating composition, e.g., include silicates, silicate esters and colloidal silicas. The colloidal silicas include both those that are solvent-based as well as aqueous systems, with the water-based colloidal silicas being most advantageous for economy. As is typical, such colloidal silicas can include additional ingredients, e.g., thickeners as, for example, up to about 5 weight percent of an above-discussed water-soluble cellulose ether. Also, a minor amount, e.g., 20 to 40 percent by weight and usually a lesser amount, of the colloidal silicas can be replaced by colloidal alumina. In general, the use of colloidal silicas will provide for heavier topcoats of silica substance over undercoated substrate materials. It is contemplated to use colloidal silicas containing up to 50 percent by weight solids, but typically, much more concentrated silicas will be diluted, for example, where spray application of the topcoat will be used.

When the topcoating silica substance is silicate, it may be organic or inorganic. The useful organic silicates include the alkyl silicates, e.g., ethyl, propyl, butyl and polyethyl silicates, as well as alkoxyl silicates such as ethylene glycol monoethyl silicate. Most generally for economy, the organic silicate is ethyl silicate. Advantageously, the inorganic silicates are used for best economy and corrosion-resistance performance. These are typically employed as aqueous solutions, but solvent-based dispersions may also be used. When used herein in reference to silicates, the term "solution" is meant to Include true solutions and hydrosols. The preferred inorganic silicates are the aqueous silicates that are the water-soluble silicates, including sodium, potassium, lithium and sodium/lithium combinations, as well as other related combinations. Referring to sodium silicate as representative, the mole ratios of $SiO_2$ to $Na_2O$ generally range between 1:1 and 4:1. For best efficiency and economy, an aqueous-based sodium silicate is preferred as the silica substance. The use of silica substance as a topcoating has been described in U.S. Pat. No. 4,365,003, the disclosure of which is incorporated herein by reference.

Other ingredients may be present in the silica substance topcoating composition, e.g., wetting agents and colorants, and the composition may contain chrome substituents if desired, but can be chrome-free as defined hereinabove to provide a totally chrome-free coating. Substances that may be present can further include thickening and dispersing agents as well as pH adjusting agents, but all such ingredients will typically not aggregate more than about 5 weight percent, and usually less, of the topcoating composition so as to provide for enhanced coating composition stability coupled with augmented coating integrity. The silica substance topcoating may be applied by any of the above described various techniques for use with the coating composition, such as immersion techniques including dip drain and dip spin procedures.

The preferred topcoats are provided from the topcoating compositions PLUS®, PLUS® L, PLUS® ML and PLUS® XL made by Metal Coatings International Inc. These may contain inorganic silicate together with one or more additional ingredients, e.g., lubricants including wax or polymeric materials, such as polyethylene, copolymers incorporating polyethylene, or polytetrafluoroethylene. Other constituents, which may also be used at least in part for their lubricity, can include graphite and molybdenum disulfide. The topcoats may be pigmented, e.g., to provide a black topcoating. A representative black topcoating composition has been disclosed in U.S. Pat. No. 5,006,597.

By any coating procedure, the topcoat should be present in an amount above about 50 mg/ft² of coated substrate. For economy, topcoat weights for cured topcoating will not exceed about 2,000 mg/ft² of coated substrate. This range is for the cured silica substance topcoating. Preferably, for best coating efficiency and silica substance topcoat economy, the topcoat is an inorganic silicate providing from about 200 to about 1,200 mg/ft² of cured silicate topcoating.

For the silica substance topcoat curing, it is typical to select the curing conditions in accordance with the particular silica substance used. For the colloidal silicas, air-drying may be sufficient; but, for efficiency, elevated temperature curing is preferred for all the silica substances. The elevated temperature curing can be preceded by drying, such as air-drying. Regardless of prior drying, a lower cure temperature, e.g., on the order of about 150° F. to about 300° F., will be useful for the colloidal silicas and organic silicates. For the inorganic silicates, curing typically takes place at a temperature on the order of about 300° F. to about 500° F. In general, cure temperatures on the order of from about 150° F. to about 700°-800° F. or more, as peak metal temperatures, may be useful. At the more elevated temperatures, cure times may be as fast as about 10 minutes, although longer cure times, up to about 20 minutes, are more usual. Also, articles can be topcoated with the silica substance topcoat while the articles are at elevated temperature, as from the curing of a chrome-free coating composition. Such could be done as by spray coat or dip drain, i.e., a dipping of the elevated temperature article into the topcoat composition, which can provide a quenching of the article. Upon removal from the topcoating composition, the article can be drained. Some to all of the topcoat curing can be achieved by the operation.

Electrodeposited Topcoating

Of special interest, the coated substrate can form a particularly suitable substrate for paint deposition by electrocoating. The electrodeposition of film-forming materials is well known and can include electrocoating of simply a film-forming material in a bath or such a bath which may contain one or more pigments, metallic particles, drying oils, dyes, extenders, and the like, and the bath may be a dispersion or ostensible solution and elevated temperature by bringing them into contact with an aqueous resin solution has been discussed in Japanese Patent Application No. 53-14746. Suitable resin solutions include alkyd, epoxy, melamine and urea resins.

For this, it has also been taught, for example in U.S. Pat. No. 4,555,445, that suitable topcoating compositions may be pigmented dispersions or emulsions. These can include copolymer dispersions in liquid medium as well as aqueous emulsions and dispersions of suitable waxes. Articles can be topcoated in these compositions, which articles are at elevated temperature such as after curing of the applied water-reducible coating, by procedures including a dip-drain or a spray coating operation. By such quench coating operation, all of the topcoating curing may be achieved without further heating. Quench coating with polymeric solutions, emulsions and dispersions, and with heated baths, has also been discussed in U.S. Pat. No. 5,283,280.

Autodeposited Topcoating

Another topcoat of particular interest is the autodeposited coating. The autodeposition of coatings provides a latex-based coating film on metal articles, with no external voltage applied in the process. In the U.S. Pat. No. 3,592,699, it is taught to apply a coating from a bath of suitable polymer latex, oxidizing agent, fluoride ion and sufficient acid to maintain a pH of from about 2.5 to 3.5. Formulated as such an acidic composition, the bath can use metal dissolution as a driving force for coating deposition. More recently, U.S. Pat. No. 5,300,323 has taught a zinc surface pretreatment with an aqueous hydrogen fluoride solution containing an additive such as boric acid. This can help negate the formation of pinholes during autodeposition coating.

Further Topcoating

The coated substrate may also have a topcoat with any other suitable topcoating, i.e., a paint or primer, including weldable primers, such as the zinc-rich primers that may be typically applied before electrical-resistance welding. For example, it has already been shown in U.S. Pat. No. 3,671,331 that a primer topcoating containing a particulate, electrically conductive pigment, such as zinc, is highly serviceable for a metal substrate that is first coated with another coating composition. Other topcoating paints may contain pigment in a binder or can be unpigmented, e.g., generally cellulose lacquers, resin varnishes, and oleoresinous varnishes, as for example tung oil varnish. The paints can be solvent-reduced or they may be water-reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, epoxies, acrylics, vinyl, including polyvinyl butyral, and oil-wax-type coatings such as linseed oil-paraffin wax paints.

Before any coating, it is in most cases advisable to remove foreign matter from the substrate surface, as by thoroughly cleaning and degreasing. Degreasing may be accomplished with known agents, for instance, with agents containing sodium metasilicate, caustic soda, carbon tetrachloride, trichlorethylene, and the like. commercial alkaline cleaning compositions, which combine washing and mild abrasive treatments, can be-employed for cleaning, e.g., an aqueous trisodium phosphate-sodium hydroxide cleaning solution. In addition to cleaning, the substrate may undergo cleaning plus etching, or cleaning plus shot blasting.

The following examples show ways in which the invention has been practiced but should not be construed as limiting the invention. In the examples, the following procedures have been employed:

Preparation of Test Panels

Unless otherwise specifically described, test panels are cold rolled, low carbon steel panels. Steel panels can be prepared for coating by first immersing in a cleaning solution. A metal cleaning solution can contain 5 ounces, per each gallon of water, of a mixture of 25 weight percent tripotassium phosphate and 75 weight percent potassium hydroxide. This alkaline bath is maintained at a temperature of about 150° F. to 180° F. Following solution cleaning, the panels can be scrubbed with a cleaning pad, which is a porous, fibrous pad of synthetic fiber impregnated with an abrasive. Thereafter, the scrubbed panels are water-rinsed and again immersed in cleaning solution. Following removal from the solution, the panels are rinsed with tap water and preferably dried.

Application of Coating to Test Parts and Coating Weight

Unless otherwise described in the example, clean parts are typically coated by dipping into coating composition, removing and draining composition therefrom, spinning off the excess, and then immediately baking or air drying at room temperature or precuring at modest temperature until the coating is dry to the touch and then baking. Baking and precuring proceeds in a hot air convection oven at temperatures and with times as specified in the examples.

Coating weights for panels, generally expressed as a weight per unit of surface area, is typically determined by selecting a panel of a known surface area and weighing it before coating. After the panel has been coated, it is reweighed and the coating weight per selected unit of surface area, most always presented as milligrams per square foot ($mg/ft^2$), is arrived at by straightforward calculation.

Coating Adhesion Test

This test is conducted by manually pressing a strip of tape coated with a pressure-sensitive adhesive against the coated surface of the test panel, which tape is then quickly removed. The coating is evaluated qualitatively according to the amount of coating removed by the adhesive on the tape, in comparison with the condition of a standard test panel.

Corrosion-Resistance Test (ASTM B117) and Rating

Corrosion-resistance of coated parts is measured by means of the standard salt spray (fog) test for paints and varnishes ASTM B-117. In this test, the parts are placed in a chamber kept at constant temperature where they are exposed to a fine spray (fog) of a 5 percent salt solution for specified periods of time, rinsed in water and dried. The extent of corrosion of the test parts can be expressed as percent of red rust.

EXAMPLE 1

To 18.9 weight parts of deionized water, there is blended with moderate agitation, 0.6 weight part of ortho boric acid and 3 weight parts of gamma glycidoxypropyltrimethoxysilane as blending continues. After mixing continues for 3 hours, there is added to this mixture an additional 31 weight parts of deionized water and a wetter blend containing 0.8 weight part of a nonionic, ethoxylated nonylphenol wetter ("nenw") having a molecular weight of 396 and a specific gravity of 1.0298 at 20/20° C. and 0.8 weight part of a "nenw" having a molecular weight of 616 and a specific gravity of 1.057 at 20/20° C. To this mixture there is then added an additional 2 weight parts of the above-mentioned silane, 2.2 weight parts of dipropylene glycol and 0.7 weight part of 1-nitropropane. To this mixture there is added 35.2 weight parts of STAPA 4ZnAl7 zinc and aluminum alloy flake paste. The paste contains about 85 weight percent zinc, about 5 weight percent aluminum, and a balance of paste liquid. The alloy flake has about 50 percent of the flake particles with a longest dimension of discrete particles of less than about 13 microns. The sum of all of these Ingredients are then ground for about 3 hours using a Cowles dissolver operating at approximately 800 revolutions per minute (rpm).

To the resulting ground mixture, there is then added, while stirring is continued for 1 hour, 0.4 weight part of sodium bistridecyl sulfosuccinate anionic surfactant and mixing is then further continued overnight. There is then added 2.9 weight parts of additional, above-described silane plus a slurry of 0.2 weight part of hydroxy ethyl cellulose slurried in 1.3 weight parts of deionized water. This bath is aged for 6 days. This resulting coating composition had a molar ratio of water to silane alkoxy groups of 30.5:1.

A clean 3×5-inch test panel as described hereinabove was then coated by drawing the coating composition down over the panel with a draw bar. The panel is precured for 10 minutes at an oven air temperature of 150° F. and cured for 30 minutes at an oven air temperature of 600° F., all in the manner as described hereinabove. The resulting panel had a smooth, grey coating of attractive appearance. The coating weight was 1968 milligrams per square foot of coated panel surface and the coating had acceptable coating adhesion. Coating weight and coating adhesion were determined as described hereinabove.

Bolts were prepared for coating as described hereinabove, except no scrubbing is used during cleaning and the bolts are cleaned by blasting with glass beads (dry honed) after oven drying. The bolts are coated by placing in a wire basket and dipping the basket into the coating composition, removing the basket and draining excess composition therefrom. During dip spinning, for the first coat, the basket is spun at 275 rpm for 10 seconds forward and 10 seconds reverse and, for the second coat, at 300 rpm and again at 10 seconds forward and 10 seconds reverse.

Draining is then followed by baking. The bolts are usually placed on a sheet for baking. Baking proceeds first at an air temperature of about 150° F. for a time up to 10 minutes and then at 600° F. for 30 minutes. The bolts are coated twice with the coating composition using this procedure and providing a coating weight of 3,138 mg/ft$^2$, determined as described hereinabove.

Selected bolts are then topcoated with a commercially available sodium silicate topcoat composition disclosed in the U.S. Pat. No. 4,365,003. The procedure used for coating and baking was as for the undercoating, but the basket spin was at 400 rpm for 10 seconds forward, 10 seconds reverse, and the cure was at 350° F. for 20 minutes. Coating weight determinations, conducted in the manner as described above in connection with the examples, showed a topcoating weight for a representative bath of 520 mg/ft$^2$.

The hex-head bolts used in the test are a specific grade of 9.8 bolts, which more particularly are 1½ inches long by about 5/16 inch in diameter at the threaded end and have 1 3/16 inches of threading on the shaft that terminates in the bolt head.

The resulting coated bolts were then subjected to the hereinbefore described corrosion-resistance test. The test bolts with the silicate topcoat have gone over 2,000 hours in testing without the appearance of first red rust, compared to red rust appearance at 600 hours for bolts coated with the same procedure but using a basecoat composition containing a simple mixture of zinc flake and aluminum flake in a 90/10 weight ratio.

EXAMPLE 2

For test purposes, there is prepared a coating composition of zinc plus tin alloy flake. This preparation is initiated as follows: To 18.9 weight parts of deionized water, there is blended with moderate agitation, 0.6 weight part of ortho boric acid and 3-weight parts the Example 1 silane as blending continues to prepare an initial silane blend. After mixing continues for 3 hours, there is added to this mixture an additional 34 weight parts of deionized water and a blend containing 0.8 weight part of the Example 1 wetter having a molecular weight of 396, 1.6 weight parts of the Example 1 wetter having a molecular weight of 616, an additional 2 weight parts of the above-mentioned silane, and 0.7 weight part of 1-nitropropane. To this mixture there is added 32.6 weight parts of STAPA 4ZnSn30 zinc and tin alloy flake paste. The paste contains about 70 weight percent zinc and about 30 weight percent tin in the alloy flake, on a metals basis, and a balance of paste liquid. The sum of all of these ingredients are then ground for about 3 hours using a Cowles dissolver operating at approximately 800 revolutions per minute (rpm).

To the resulting ground mixture, there is then added, while stirring is continued for 1 hour, 0.4 weight part of sodium bistridecyl sulfosuccinate anionic surfactant and mixing is then further continued overnight. There is then added 2.9 weight parts of additional, above-described silane plus a slurry of 0.3 weight part of hydroxy ethyl cellulose slurried in 2 weight parts of deionized water.

For comparative purposes, there is prepared a standard comparative coating composition using the procedure described hereinabove. For this composition there is blended with the initial silane blend an additional 29.4 weight parts of water and a blend of 1.5 weight parts of each wetter, 2 weight parts of the silane, 0.7 weight part of the 1-nitropane, 1.2 weight parts of dipropylene glycol, and 4.3 parts of aluminum flake paste. To this there is added 31.2 parts of zinc flake paste. Consistent with the above-described procedures and amounts, there is then added the anionic surfactant, additional silane, cellulose/water slurry, and also 0.2 weight part of a liquid blend of petroleum derivatives having a specific gravity of 0.9 used as a defoamer.

In this test, the test parts were M-8 bolts, which are more particularly described in Example 3. The bolts were prepared for coating, and coated, all as described in Example 3, except the cure temperature was 232° C. The resulting parts have a coating weight of 2,463 mg/ft$^2$. Coating weight was determined by the weigh-coat-weigh procedure as described hereinabove.

The parts were then topcoated with a commercially available sodium silicate topcoat composition disclosed in the U.S. Pat. No. 4,365,003. The procedure used for coating and baking was as for the undercoating, but the cure was at 176° C. for 20 minutes. Coating weight determination, conducted in the manner as described above, showed a topcoating weight of 433 mg/ft$^2$.

The resulting coated parts were then subjected to the hereinbefore described corrosion-resistance test. The test parts with the silicate topcoat and zinc plus tin alloy undercoat went for 1080 hours in testing with a rating of 4.8 on a scale of 5.0 (best) in regard to appearance of red rust. Comparatively the test parts with the silicate topcoat and the zinc flake plus aluminum flake undercoat at 1,080 hours of testing had a rating of 4.2.

EXAMPLE 3

An invention test composition is prepared with the following ingredients. There is mixed together 7.37 weight parts of the Example 1 silane, a wetter blend containing 1.21 weight parts of the Example 1 wetter having a molecular weight of 396, and 1.39 weight parts of the Example 1 wetter having a molecular weight of 616, 4.33 weight parts of dipropylene glycol, 0.62 weight part of 1-nitropropane and 0.45 weight part of sodium bistridecyl sulfosuccinate anionic surfactant. To this mixture there is added 29.83 weight parts of zinc and aluminum alloy flake paste. The paste contains about 85 weight percent zinc and about 6 weight percent aluminum in the alloy flake and an about 9 weight percent balance paste liquid. The alloy flake has about 98 percent of the flake particles with a longest dimension of discrete particles of less than about 15 microns. The sum of all of these ingredients is then vigorously mixed together.

To the resulting ground mixture, there is then added, while stirring is continued, a blend of 0.53 weight part boric acid in 54.27 weight parts deionized water. There is then added 0.4 weight part of hydroxy ethyl cellulose and stirring is continued overnight.

For comparative purposes, there is then used the standard comparative coating composition described in Example 2.

In this test, bolts, as more specifically described hereinbelow, are used. The bolts are prepared for coating as described hereinabove, except no scrubbing is used during cleaning and the bolts are cleaned by blasting with glass beads (dry honed) after oven drying. The bolts are coated by placing in a wire basket and dipping the basket into the coating composition, removing the basket and draining excess composition therefrom. After draining, the basket is spun at 300 rpm for 10 seconds forward and 10 seconds reverse.

Draining is then followed by baking. The bolts are usually placed on a screen for baking. Baking proceeds first at an air temperature of about 66° C. for a time up to 10 minutes and then at 329° C. for 30 minutes. The bolts are coated twice with the coating composition using this procedure and providing a coating weight of about 1,900 mg/ft$^2$, determined as described hereinabove.

The bolts used in the test are M-8 bolts, which more particularly are 1.4 inches long by about 5/16 inch in diameter at the threaded end and have 1 3/16 inches of threading on the shaft that terminates at the bolt head.

The resulting coated bolts are then subjected to the Society of Automotive Engineers corrosion test SAE J2334. The test cycle was a 24-hour test cycle. In each test cycle there was used a humid stage, a salt application stage and a dry stage. The humid stage was 100% humidity for 6 hours at 50° C. The salt application stage was for 15 minutes at ambient conditions. The dry stage was 50% humidity at 60° C. for 17 hours and 45 minutes.

In the test, the bolts coated with the standard comparative coating showed first red rust at 56 cycles. However, the bolts coated with the invention test composition passed 89 cycles with no red rust.

The invention claimed is:

1. A coated substrate protected with a chrome-free, corrosion-resistant coating from a composition comprising:
   (A) liquid medium;
   (B) zinc alloy in flake form comprising greater than 50 weight percent zinc in said alloy flake and a balance of less than 50 weight percent of non-zinc alloy metal; and
   (C) silane binding agent.

2. The coated substrate of claim 1 wherein said liquid medium is one or more of water and organic liquid and said water, when present, is present in an amount above about 25 weight percent of said coating composition.

3. The coated substrate of claim 1 wherein said zinc alloy in flake form is zinc alloyed with at least one agent selected from the group consisting of aluminum, magnesium, tin, nickel, cobalt and manganese.

4. The coated substrate of claim 1 wherein said zinc alloy in flake form is a zinc-aluminum-magnesium alloy flake.

5. The coated substrate of claim 1 wherein said zinc alloy in flake form is an alloy having at least about 90 percent of the flake particles with a longest dimension of less than about 15 microns and has at least about 50 percent of the flake particle with a longest dimension of less than about 13 microns, and said composition further contains non-alloyed particulate metal.

6. The coated substrate of claim 1 wherein said zinc is alloyed with one or more of tin and aluminum, with said zinc alloyed with aluminum containing less than about 20 weight percent aluminum, while said zinc alloyed with tin contains not more than about 30 weight percent tin.

7. The coated substrate of claim 1 wherein said zinc alloy in flake form comprises a paste containing less than about 15 weight percent aluminum in said alloy flake, on a metals basis, and up to about 10 weight percent paste liquid, basis weight of said paste.

8. The coated substrate of claim 7 wherein said paste contains from about 85 to about 86 weight percent zinc in said alloy and from about 4 to about 8 weight percent of aluminum in said alloy, both basis 100 weight percent of said paste.

9. The coated substrate of claim 7 wherein said paste contains from about 7 to about 10 weight percent of paste liquid and contains from about 4 to about 5 weight percent of said aluminum, both basis 100 weight percent of said paste.

10. The coated substrate of claim 8 wherein said zinc-aluminum alloy paste is a paste of zinc and aluminum alloy in flake form containing from about 85 to about 86 weight percent zinc, from about 4 to about 8 weight percent aluminum and a balance of from about 7 to about 10 weight percent paste liquid, all basis being 100 weight percent of the paste.

11. The coated substrate of claim 1 wherein said silane binding agent is a water-reducible, organofunctional binding agent containing alkoxy groups, which silane binding agent contributes from about 3 to about 20 weight percent of said coating composition.

12. The coated substrate of claim 1 wherein said coating composition has a pH within the range of from greater than 6 to about 7.5, contains water in an amount above about 30 weight percent, and has a molar ratio of water to silane alkoxy groups above about 4.5:1.

13. The coated substrate of claim 1 wherein said coating additionally comprises one or more of thickener and wetting agent, said coating is topcoated with a composition containing silica substance and said topcoating provides silica substance from at least one agent selected from the group consisting of colloidal silica, organic silicate and inorganic silicate.

* * * * *

UNITED STATES PATENT AND TRADEMARK OFFICE
CERTIFICATE OF CORRECTION

PATENT NO. : 7,740,947 B2  
APPLICATION NO. : 11/710749  
DATED : June 22, 2010  
INVENTOR(S) : Maze et al.

It is certified that error appears in the above-identified patent and that said Letters Patent is hereby corrected as shown below:

On the Title Page, Item (73), Assignee, delete "Chardon (CH)" and insert -- Chardon (OH) --

Signed and Sealed this

Tenth Day of August, 2010

David J. Kappos  
*Director of the United States Patent and Trademark Office*